United States Patent [19]

Neiheisel et al.

[11] Patent Number: 5,023,427
[45] Date of Patent: Jun. 11, 1991

[54] METHOD AND APPARATUS FOR AUTOMATICALLY ALIGNING PROXIMAL EDGES OF SHEETS TO BE BUTT WELDED

[75] Inventors: Gary L. Neiheisel, Cincinnati; David C. McGraw, Franklin, both of Ohio

[73] Assignee: Armco Steel Company, L.P., Middletown, Ohio

[21] Appl. No.: 508,901

[22] Filed: Apr. 12, 1990

[51] Int. Cl.⁵ ............................................. B23K 26/02
[52] U.S. Cl. ........................ 219/121.82; 219/121.63; 219/121.31; 228/49.4; 269/276
[58] Field of Search ........... 219/121.82, 121.6, 121.85, 219/121.63, 121.64, 121.67, 121.72, 121.31; 228/49.4; 269/276

[56] References Cited

U.S. PATENT DOCUMENTS

| | | | |
|---|---|---|---|
| 3,582,609 | 6/1971 | Morley | 219/161 |
| 3,701,881 | 10/1972 | Rother et al. | 219/123 |
| 4,152,573 | 5/1979 | Saurin et al. | 219/121.6 |
| 4,238,658 | 12/1980 | Kalnin et al. | 219/9.5 |
| 4,354,090 | 10/1982 | Nilsen | 219/121.63 |
| 4,436,980 | 3/1984 | Pache et al. | 219/123 |
| 4,443,686 | 4/1984 | Pache et al. | 219/123 |
| 4,577,088 | 3/1986 | Sharp | 219/121.64 |
| 4,623,777 | 11/1986 | Aihara et al. | 219/121.63 |
| 4,714,818 | 12/1987 | Mazac | 219/123 |
| 4,733,815 | 3/1988 | Sturm | 228/4.1 |
| 4,765,532 | 8/1988 | Uomoti | 228/212 |
| 4,840,303 | 6/1989 | Fujii et al. | 228/49.4 |

Primary Examiner—C. L. Albritton
Attorney, Agent, or Firm—Frost & Jacobs

[57] ABSTRACT

There is provided a method and device for automatically aligning the proximal edges of two or more appreciably magnetic sheets to be connected along abutting edges. The device preferably includes supports to align the magnetic sheets in substantially planar relationship aligned relative one another with their proximal edges oriented in approximately abutting relationship and generally aligned along a predetermined contiguous seam line. At least one of the sheets is to remain moveable on the supports relative to the other sheets. The alignment device further preferably includes an electromagnetic mechanism for simultaneously creating an effective north pole along the proximal edge of one of the supported sheets, and an effective south pole along the confronting proximal edge of the other sheet. These opposing poles cause a magnetic attraction between the proximal edges of the sheets which automatically pulls and aligns the proximal edges into intimate contact along their length. Once aligned in intimate contact, it is preferred that all of these sheets be restrained from further movement so that optimal welding procedures can be completed.

24 Claims, 4 Drawing Sheets

METHOD AND APPARATUS FOR AUTOMATICALLY ALIGNING PROXIMAL EDGES OF SHEETS TO BE BUTT WELDED

TECHNICAL FIELD

This invention relates to a method and apparatus for automatically aligning the confronting edges of two or more appreciably magnetic sheets to be connected along abutting edges, and, more particularly, to a method and apparatus for automatically intimately aligning the confronting edges of two or more sheets of steel or similar material to be butt welded along a common seam line by high energy laser, electron beam, or plasma arc welding device.

BACKGROUND ART

In a wide variety of manufacturing and steel processing applications, it is often desirable or necessary to join together sheets or strips of steel, alloys or the like, such as by welding along a contiguous edge. Such joining can be accomplished by conventional seam welding equipment, butt welding equipment, arc welding apparatus, high energy lasers, electron beam or plasma arc welding devices.

It has been observed that the quality of the seam-weld joining sheets of material directly influences both mechanical and microstructural properties of the resulting assembly. Consequently, it is absolutely essential to optimize the quality of the weld in many of today's advanced technology applications. In particular, the quality of the weld effects the resulting material microstructure, microhardness, tensile properties, formability, fatigue strength, and fracture toughness, which all directly affect the overall value of the joining process and the resultant joined pieces. In short, the mechanical properties of the weld should be as close as possible to those of the base metals being welded. It should be noted that sheets to be joined need not be made of identical materials, and often are not. The registration or "fit up" of the opposing proximal edges of sheets of material to be joined is also critical to ensuring the optimal weld seam, especially in high speed laser-welding applications where a very narrow gap must be maintained along the seam due to the small focused laser beam spot size. A uniform weld profile is largely determined by the fit-up and gap width between the proximal edges when the weld is made.

Butt welding of steel strips and the like has been accomplished by the implementation of various arrangements such as that described in U.S. Pat. No. 4,623,777, which issued to M. Aihara et al. on Nov. 18, 1986. In particular, the Aihara reference describes the use of an inlet clamp and an outlet clamp for holding opposing edges of the steel members to be welded in butted position. One clamp is moveable relative to the other clamp to adjust the gap between the butted edges of the steel strips. As can be appreciated from a review of this reference, however, mechanical clamping of strips to be joined is relatively cumbersome and inefficient for use with larger sheets to be joined. In high speed applications, mechanical clamping structures can also interfere with required movement of the sheets and/or the welding device. The Aihara reference further emphasizes the problems generally encountered with non-uniform confronting edges of parts to be joined and the varying gap widths which can result from conventional raked shears and similar trimming devices.

U.S. Pat. No. 4,765,532, which issued to A. Uomoti et al. on Aug. 23, 1988, also incorporates mechanical clamping means for clamping the opposing end portions of successive strips to be joined. The Uomoti device further includes corrective machining means attached in conjunction with a moveable table to simultaneously machine the opposing edges of both strips in order to minimize the variance of gap therebetween when the table is moved toward a stationary table to butt the respective strips against one another. As in Aihara et al., however, the mechanical clamping structures of Uomoti are relatively large and intrusive, and tend to make the joining process inefficient as a result.

Recognizing fit-up or registration problems common in laser butt welding applications, U.S. Pat. No. 4,577,088, which issued to C. Sharp on Mar. 18, 1986, teaches that the opposed sides of the workpiece are to be canted in butting relationship in order to locate burrs on the edges away from the weld line. The workpiece in Sharp is contemplated as being a single piece formed into a cylindrical member and seam welded to form a can body or the like. The edges of the workpieces are urged toward each other during welding by the application of tangential forces applied through the mechanical clamping means which are located about the periphery of the workpiece. The Sharp method for laser butt welding is limited to forming can bodies or similar cylindrical objects, and includes the inherent deficiencies of utilizing cumbersome mechanical clamping devices. Moreover, the canted orientation of the workpiece is not broadly applicable to the much more common substantially planar relationship often required in butt joint procedures.

U.S. Pat. No. 4,733,815, which issued to J. Sturm on Mar. 29, 1988, discloses a process for guiding sheets on different conveying planes which are inclined at an acute angle to one another to enable continuous feeding of sheets to be butt welded using a stationary welding device. While an arrangement as contemplated in Sturm may be applicable in applications where continuous feeding of material is possible, such an arrangement is not easily adaptable to butt welding applications where smaller pieces are to be seam welded together in a noncontinuous manner. Moreover, Sturm requires the use of large gripping rollers to be arranged above and below the strips or sheets adjacent the welding device. Similarly, the z-bar guide apparatus set forth in U.S. Pat. No. 4,354,090 (which issued to C. Nilsen on Oct. 12, 1982) provides oppositely disposed channels which guide the opposing edges of sheets together as they are continuously fed toward the discharge end of the z-bar. The channels are tapered and converge toward one another to provide progressively abutting edges of sheets as they move longitudinally through the z-bar arrangement.

Magnetic devices have been applied to arc welding applications such as shown in U.S. Pat. Nos. 4,436,980 and 4,443,686 which issued to N. Pache et al., and U.S. Pat. No. 4,714,818 which issued to K. Mazac; particularly for controlling the welding arc about the periphery of a weld seam to be applied to abutting pipe sections and the like. Magnets have also been utilized to provide hold-down forces to magnetic sheets to be welded together. In particular, U.S. Pat. No. 3,582,609, which issued to J. Morely et al. on June 1, 1971, describes base-mounted electromagnetic clamps on either side of the frame for gripping the adjacent ends of strips to be joined. Because the magnetic clamp of the Morely reference utilizes a magnetic bed plate below the material to be clamped and an electromagnet above, the actual material to be clamped need not be magnetic in nature. However, the Morely magnetic clamps are spaced from the welding zone to prevent changes in inductance in the welding circuit, and must utilize mechanical nose clamp devices to prevent buckling of the strip between the clamp and the welding zone. As a consequence, the clamping arrangement of Morely is quite cumbersome and restrictive.

U.S Pat. No. 3,701,881, which issued to W. Rother et al. on Oct. 31, 1972, contemplates the use of electromagnetic holding plates comprising electromagnetic coils and iron cores which are embedded in a non-magnetic material. The parts of the electromagnetic coils which are directed toward the upper side of the holding plates are covered by non-magnetic material to prevent interference with the welding arc. While these magnetic hold-down devices are clearly less cumbersome than the mechanical clamping devices widely utilized in the industry, heretofore there has not been available a simple device which can provide automatic registration and alignment of confronting edges of two or more plates to be butt welded together which does not require the use of complicated mechanical structures, continuous feeding of the sheets themselves, or other cumbersome moving parts to ensure the intimate contact along the abutting edges of the sheets to be joined.

DISCLOSURE OF THE INVENTION

It is an object of this invention to provide an automatic alignment device for butting the proximal edges of two or more magnetic sheets to be joined in intimate contact.

It is another object of the present invention to provide an automatic alignment device for opposing edges of sheets to be joined which overcomes the above-described problems and shortcomings of the clamps, hold-down mechanisms, and alignment devices heretofore available in the industry.

It is yet another object of the present invention to provide a device for automatically aligning the proximal edges of sheet materials to be connected along abutting edges which is efficient, simple, and does not require cumbersome mechanical devices.

It is also an object of this invention to provide a device which can align the confronting edges of adjacent sheets for laser cutting and laser welding, and which can be successively activated to automatically align those sheets for successive cutting and welding operations.

In accordance with one aspect of the present invention, there is provided a device for automatically aligning the proximal edges of two or more appreciably magnetic sheets to be connected along abutting edges. The device preferably includes supports to align the magnetic sheets in substantially planar relationship relative one another with their proximal edges oriented in approximately abutting relationship along a contiguous seam line. At least one of the sheets is to remain moveable relative to the other sheet. The alignment device further preferably includes an electromagnet for simultaneously creating an effective north pole along the proximal edge of one of the supported sheets, and an effective south pole along the corresponding proximal edge of the other sheet. These opposing poles cause a magnetic attraction between the confronting proximal edges of the sheets which automatically pulls the proximal edges into intimate aligned contact along their length. Once aligned in intimate contact, it is preferred that all of the sheets be restrained from further movement so that optimal welding procedures can be completed.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
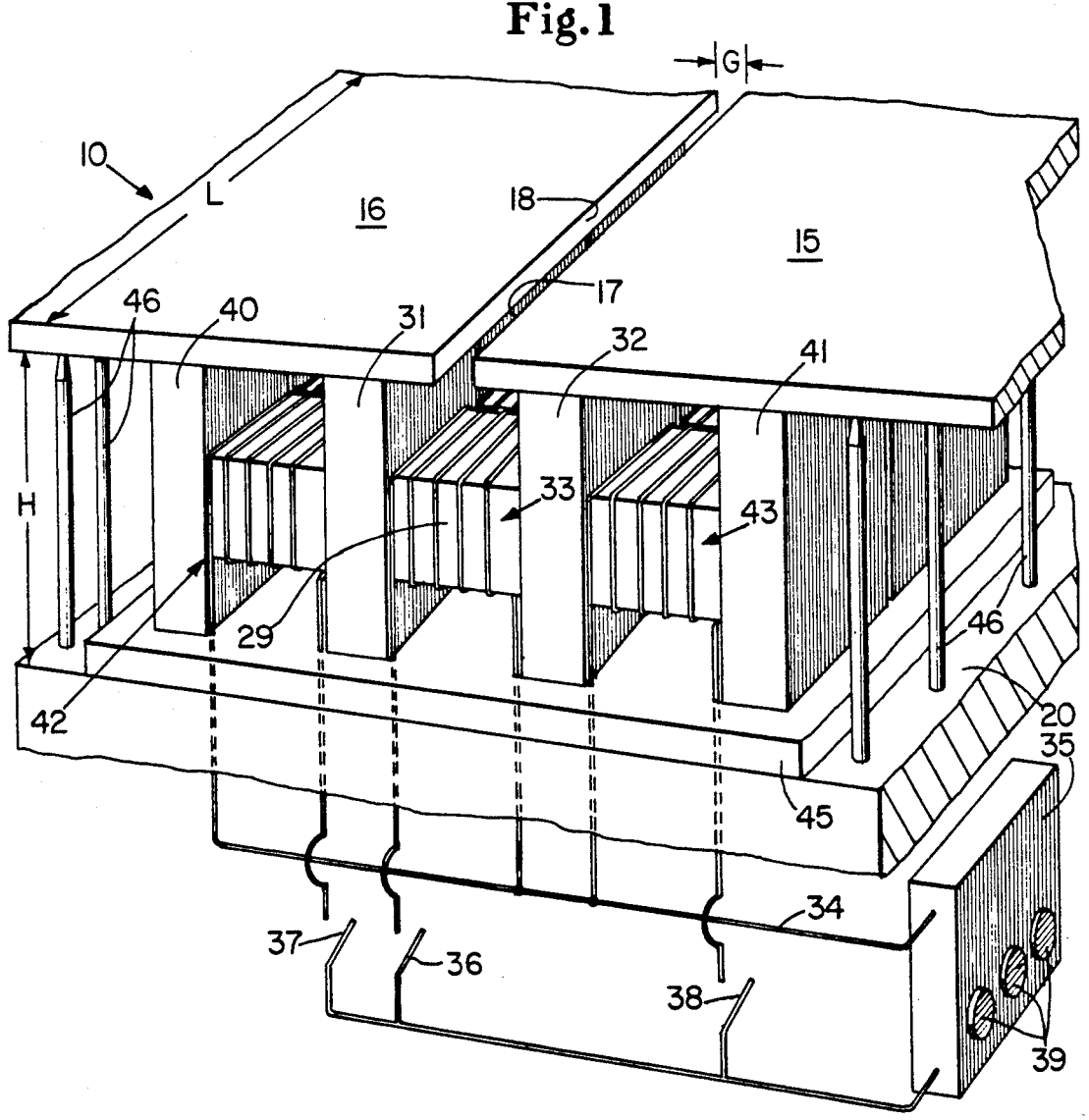
FIG. 1 is a partial schematic cross-sectional view of a preferred alignment device made in accordance with the present invention.
Figure 2:
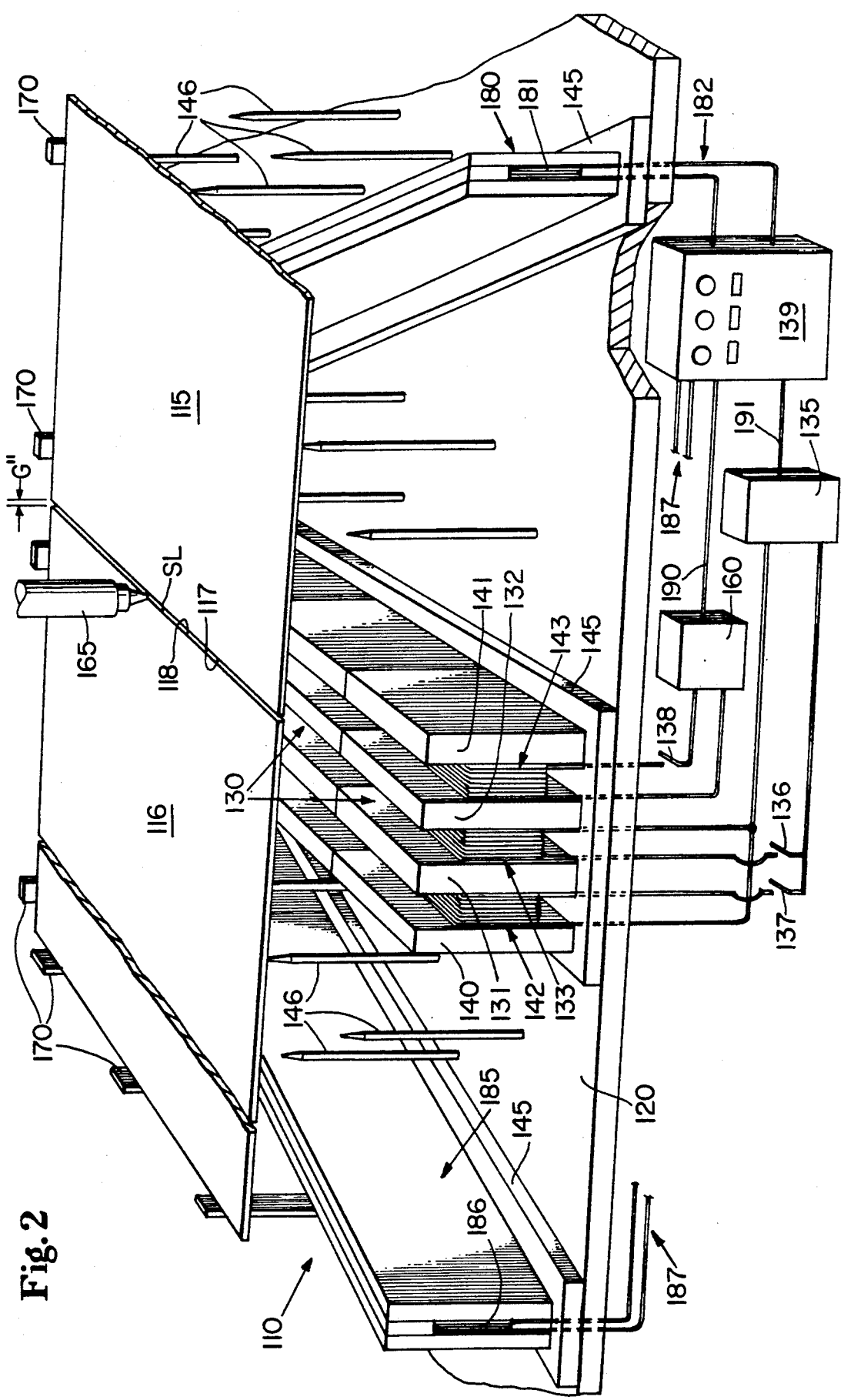
FIG. 2 is a partial perspective view of an alternate preferred embodiment of an alignment device made in accordance with the present invention.

Referring now to the drawings in detail, wherein numerals having the identical final two digits (e.g. 15, 115, 215 and 315) indicate corresponding elements throughout the views, FIG. 1 illustrates a preferred embodiment of an automatic alignment device 10 of the present invention. FIG. 2 illustrates an alternate preferred embodiment of the automatic aligning device for use in conjunction with a laser cutting and/or welding arrangement.

FIG. 1 illustrates schematically an alignment device 10 as contemplated in the present invention. Alignment device 10 preferably comprises an electromagnet 30 including the spaced, upstanding poles 31 and 32, respectively. Electromagnet 30, in turn, preferably comprises a core 29 made of high magnetic permeability core material, and is situated so that its spaced poles 31 and 32 straddle the proximal edges 17 and 18 of two or more appreciably magnetic sheets 15 and 16, respectively, which are to be connected along their abutting edges along a contiguous seam line formed along gap G. In particular, it is contemplated that the contiguous seam line which will join the two abutting sheets will be substantially centrally aligned between poles 31 and 32, as will be seen more fully as the operation of alignment device 10 is described.

As illustrated, upstanding poles 31 and 32 can also serve as means for supporting these sheets adjacent their confronting edges 17 and 18. As used herein, the terms appreciably magnetic and magnetic are to be understood to connote materials which support magnetic lines of flux, including, but not limited to soft magnetic, ferro-magnetic, and ferrimagnetic materials. Although not to be interpreted as a limitation to the applicability of the present invention, sheets of material to be joined or welded typically are in a range of about 0.005 inches (about 0.127 mm) to about 0.5 inches (about 12.7 mm) in thickness.

It is contemplated that support for sheets 15 and 16 can also be provided by additional sheet supports (e.g. supports 46) as illustrated. Alignment device 10 is illustrated as being mounted on work table or surface 20, and a non-magnetic insulator 45 is preferably provided to isolate the magnetic field which will be created by electromagnet 30 from work table 20 and the surrounding environment. Any sufficiently sturdy, non-magnetic insulator material (such as MICARTA, as available from Westinghouse Electric Corp., Micarta Division, Hampton, SC) can equally be employed.

Excitation coil 33 is illustrated as being functionally associated with poles 31 and 32, and is connected to a power source 35 (e.g. a DC current source) via power line 34 and switch 36. Controls 39 for power source 35 are shown as being illustrative of any means for controlling switch 36 and the application of current to coil 33. Controls 39 could equally take the form of manual on-/off switches, rheostat controls, or a more complex programmable control system, as desired.

It is preferred that first sheet 15 and second sheet 16 be supported in a substantially planar relationship relative one another with their proximal edges 17 and 18, respectively, oriented in approximately abutting relationship, as illustrated. As can be understood, it is contemplated that the heighth H of auxiliary support posts 46 will be substantially identical to the height of poles 31 and 32 when mounted on insulator 45 in order to support sheets 15 and 16 in an edge-to-edge relationship for alignment and connection procedures. While the actual gap G between proximal edges 17 and 18 will vary slightly between each application, it is preferred that this approximately abutting relationship be uniformly maintainable throughout successive iterations in any particular set up so that the proper size electromagnet 30 can be chosen to draw sheets 15 and 16 together into intimate butting contact, as will be described. The gap G between proximal edges 17 and 18 is preferably within a range of a few thousandths of an inch, which is easily obtainable quickly and reliably by either manual placement of individual sheets, or through automated or robotic placement.

As also illustrated in FIG. 1, to accommodate the transverse length L of sheets 15 and 16, and particularly the length L of proximal edges 17 and 18, it is contemplated that a plurality of electromagnets 30 may be required to straddle proximal edges 17 and 18 along their entire transverse length. While it is further contemplated that a customized electromagnet 30 may be designed to accommodate the full transverse length L as a single integral unit, it may be desired to avoid a need for customized parts to minimize expense and to facilitate maintenance and repair. As will be seen, other devices for accomplishing the automatic alignment of the present invention can be substituted for electromagnet 30 as well.

As mentioned, FIG. 1 shows sheets 15 and 16 supported in approximately abutting relationship having a gap G between their proximal edges 17 and 18, respectively, and in a substantially planar relationship relative one another. It is also preferred that the approximately abutting confronting edges 17 and 18 be substantially centrally located between poles 31 and 32 along their transverse length. Prior to connecting the adjacent sheets along their abutting edges with a high energy laser, electron beam, plasma arc or similar welding process, it is necessary to closely align the confronting or proximal edges 17 and 18 and to generally minimize gap G therebetween to ensure an optimum weld seam. It is just such alignment which can be automatically accomplished by the present invention.

Figure 1A:
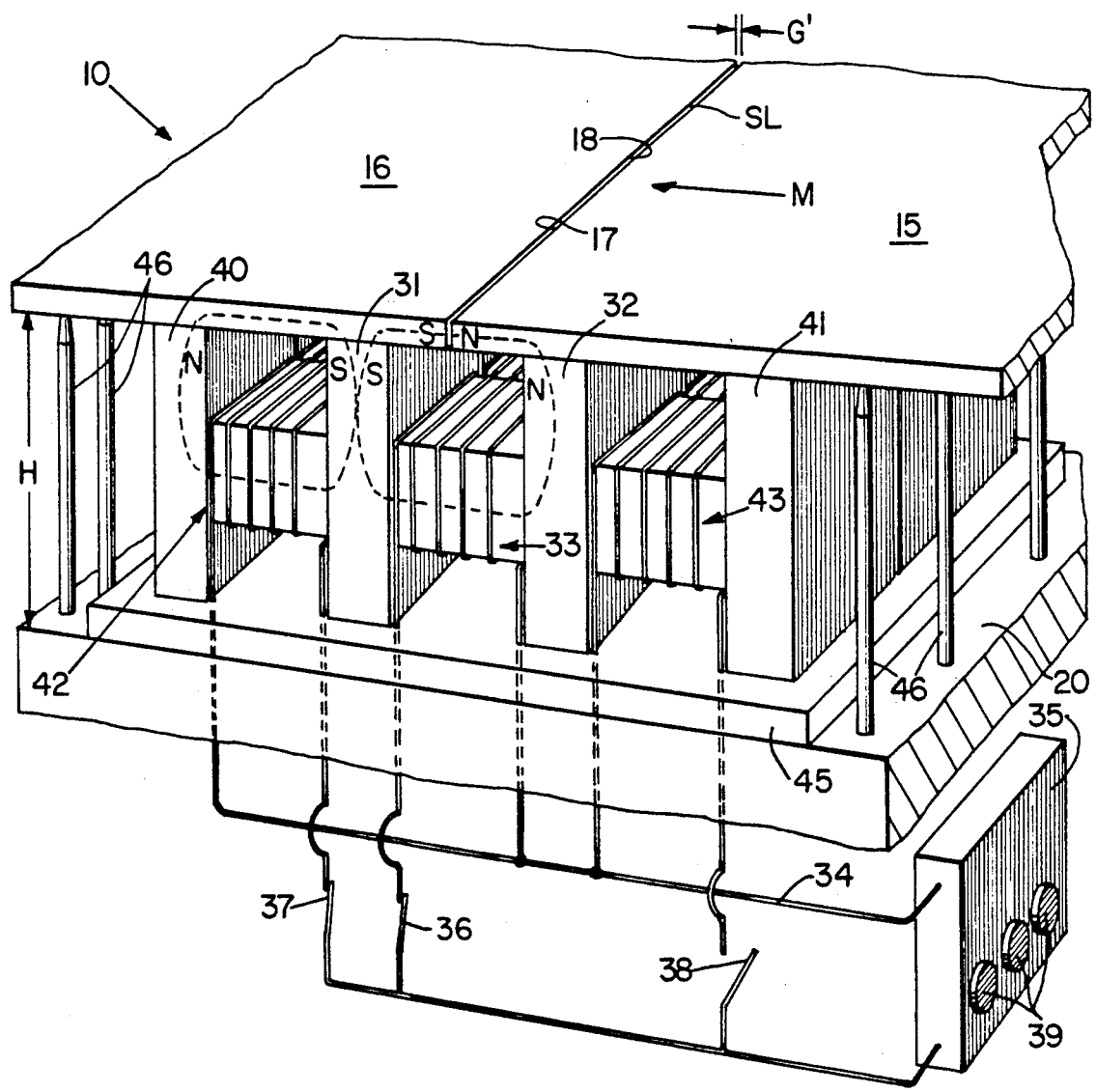
FIG. 1a is a view similar to FIG. 1, illustrating application of the automatic aligning characteristics of the present invention.

Once the appreciably magnetic sheets 15 and 16 are supported as shown in FIG. 1, it is preferred that one of the sheets (i.e. either 15 or 16) be restrained against movement by appropriate clamping or the like. In the arrangement illustrated in FIGS. 1 and 2, excitation coil 42 and its associated poles 31 and 40 provide an electromagnetic device adjacent the lower surface of sheet 16 which can be utilized to hold sheet 16 in place during alignment and welding procedures, if desired. Particularly, coil 42 is energized by providing current from power source 35 and by closing switch 37 to complete the circuit. As shown in FIG. 1a, the magnetic flux resulting from energization of coil 42 causes at least a portion of pole 40 to become polarized (e.g. an effective north pole), while a portion of pole 31 becomes oppositely polarized (e.g. an effective south pole), thereby creating a magnetic attraction with sheet 16. It is contemplated that the overall size and magnetic power of coil 42 and its poles 40 and 31, respectively, can be determined to apply adequate hold-down force to sheet 16 as appropriate. In this regard, it may be desired and/or necessary to provide a plurality of coils 42 and corresponding poles 40 and 31 along the transverse length L of sheet 16 to provide sufficient holding power in any particular application.

While any means for restraining movement of sheet 16 (e.g. mechanical clamps or the like) could equally be utilized, it is preferred to provide this restraining force through the use of magnetic hold-downs for simplicity and to minimize cumbersome structures with multiple moving parts which tend to complicate the system and reduce efficiency and dependability. Similarly, while the magnetic forces shown and described in the present invention can be achieved by any means for creating effective north and south poles (e.g. permanent magnets), it is preferred to utilize electromagnetic devices so that the magnetic fields can be precisely controlled as appropriate.

Central excitation coil 33 is energized by providing current from power source 35 through power line 34 and by closing switch 36 to complete the circuit. As illustrated in FIG. 1a, the magnetic flux caused by energization of coil 33 causes a portion of pole 31 to become polarized (e.g. an effective south pole), while a portion of pole 32 becomes oppositely polarized (e.g. an effective north pole). Again, it is preferred that the structure of magnetic core 29 and poles 31 and 32 be such that the effective north and south poles created extend along substantially the full transverse length L of the proximal edges of adjacent sheets 15 and 16, as illustrated. Again, the means for creating the effective oppositely polarized edges need not be made as an integral unit, and can be provided as a plurality of magnetic structures in series. As will be understood, the magnetic flux created by energization of coil 33 creates an effective north pole along the proximal edge of one of the sheets (e.g. sheet 15), and an effective south pole along the corresponding proximal edge of the other sheet (e.g. sheet 16). The creation of effective north and south poles along oppositely disposed proximal edges 17 and 18, respectively, in turn causes the magnetic domain structure of the at least appreciably magnetic sheets 15 and 16 to similarly take on charges corresponding to the pole of electromagnet 30 adjacent each such edge. Consequently, proximal edge 17 becomes an effective north pole along substantially its entire length, while proximal edge 18 becomes an effective south pole in the application illustrated in FIGS. 1 and 1a.

Obviously, the north/south relationship of the poles 31 and 32 could easily be reversed by appropriate arrangement of coil 33. By simultaneously creating an effective north pole along the proximal edge of one adjacent sheet, and an effective south pole along the corresponding proximal edge of the other sheet, a magnetic attraction between these proximal edges tends to automatically attract and pull these proximal edges into intimate aligning contact along their entire transverse length L, thereby narrowing gap G to a minimum distance G' and locating proximal edges 17 and 18 in an optimum position for welding along contiguous seam line SL. While neither sheet 15 or 16 need be restrained from movement during excitation of coil 33 for alignment procedures, it is preferred to restrain one of the sheets merely to better limit the resulting contiguous seam line to a substantially predetermined location. By carefully controlling preliminary support of the sheet to be restrained (e.g. by preliminary alignment stops which will be discussed), the location of the seam line can be relatively uniformly predetermined.

Because sheet 16 has preferably been restrained from movement by energization of coil 42 as described above, the magnetic attraction between the proximal edges 17 and 18 will tend to cause sheet 15 to move in a direction indicated by the arrow M in FIG. 1a toward sheet 16. It is contemplated that the effective magnetic poles created along proximal edges 17 and 18 is preferably sufficient to overcome opposing frictional forces tending to hold sheet 15 in its original position so that proximal edges will automatically align in intimate contact with one another along substantially their entire transverse length L immediately upon energization of coil 33.

It has further been found that in applications where the magnetic attraction created between the proximal edges of sheets 15 and 16 is not sufficient to overcome the frictional force opposing movement of sheet 15 (e.g. in applications where thicker sheet material is to be joined), it may be advantageous to provide means for reducing those frictional forces. A convenient and effective means for reducing frictional forces may be provided by applying a vibration force to sheet 15 and/or the structures (i.e. poles 32 and 41 and/or support columns 46) supporting sheet 15. While vibration forces could generally be applied to work table 20, it has been found most convenient and effective to apply a vibration or friction-reducing force to sheet 15 by applying alternating current to the third coil or right outer coil 43 illustrated in FIGS. 1 and 1a (i.e. power source 35 can be capable of providing either DC or AC as desired). In particular, after coils 42 and 33 have been energized as described above, right outer coil 43 can be energized with alternating current, which will create alternating magnetic flux through portions of poles 32 and 41. This alternating arrangement has been found to create sufficient disruptive magnetic forces to reduce frictional forces tending to maintain sheet 15 at rest, thereby facilitating the magnetic attraction between the proximal edges of sheets 15 and 16 to automatically align the proximal edges in intimate contact along their length.

Once proximal edges 17 and 18 have been brought into optimal alignment by the magnetic attraction established by alignment device 10, it is preferred that sheet 15 be restrained against further movement so that welding procedures can be reliably accomplished along seam line SL. In a preferred arrangement, it is contemplated that once the sheets have been aligned in intimate contact by the magnetic attraction as described, coil 43 can be energized with direct current to provide a magnetic hold-down device for maintaining sheet 15 in position. In particular, energization of coil 43 with direct current will produce effectively oppositely polarized poles 32 and 41 to electromagnetically restrain sheet 15 from further movement.

It is further contemplated that upon energizing coil 43 in its hold-down mode, current to coil 33 can be discontinued as sheets 15 and 16 will be held in optimal abutting relationship along their edges 17 and 18, respectively, by the electromagnetic hold-down forces provided by coils 42 and 43, respectively. It should be understood that while it is preferred to provide the four-pole, three-coil electromagnetic arrangement illustrated in FIGS. 1 and 1a for optimum performance of alignment device 10, the electromagnets formed by coils 42 and 43 and their respective poles could equally be independently provided and spaced from electromagnet 30. Moreover, as will be described below, additional hold-down magnets or other hold-down devices can be used in conjunction with alignment device 10 of the present invention. In particular, electromagnet 30 could be a simple two-pole, single coil electromagnet, or, alternatively, a series of permanent magnets could be aligned adjacent each of the proximal edges 17 and 18 to similarly create the effective oppositely charged north and south poles along those edges to create the required attractive forces between sheets 15 and 16.

An alternate preferred embodiment of the present invention is illustrated in FIG. 2. Corresponding to alignment device 10 of FIGS. 1 and 1a, alignment device 110 of FIG. 2 is mounted upon a work table 120 and includes the centrally located series of electromagnets 130 linearly aligned as shown. Outer left coil 142 and outer right coil 143 are similarly shown to provide the four-pole (i.e. poles 131, 132, 140 and 141) three-coil (i.e. coils 133, 142 and 143) arrangement as described above with regard to alignment device 10. Coil 143, however, is shown as being connected to an independent power source 160 which has both AC and DC capabilities. In this way, vibration can be applied to sheet 115 by application of alternating current to coil 143, and magnetic hold-down power can be provided to sheet 115 when direct current is energizing coil 143.

Auxiliary magnetic hold-down devices 180 and 185 are also illustrated as part of alignment device 110. It is contemplated that electromagnet 185 will be controlled via its coil 186 and power line 187 in conjunction with coil 142 and its poles 140 and 131 to provide magnetic hold-down power for restraining sheet 116 from movement during alignment and processing steps. Similarly, auxiliary hold-down magnet 180 and its coil 181 are preferably controlled via power line 182 to augment the hold-down or restraining power imposed by coil 143 and its poles 132 and 141 when movement restraint of sheet 115 is desired. It should be emphasized that while hold-down capabilities for the sheets to be joined is preferred as described, the automatic alignment device of the present invention does not require that any of the sheets be restrained from movement during alignment. Additionally, while the preliminary restraint of sheets 16 and 116, respectively, has been described, it should be understood that such description was solely for the purpose of illustration and that preliminary restraint of sheets 15 and 115, respectively, can equally be employed for preferred use of this invention.

Alignment or registration stops 170 are shown as providing preliminary alignment guides for the peripheral edges of sheets 115 and 116. Stops 170 are merely illustrated as means for orienting sheets 115 and 116 such that their proximal edges 117 and 118, respectively, are in approximately abutting relationship along a contiguous seam line SL which is generally centered above and between poles 131 and 132 of electromagnets 130. Obviously, any means for preliminarily aligning sheets 115 and 116 in approximately abutting relationship could be equally substituted for stops 170, as appropriate. Alignment device 110 also includes a plurality of auxiliary sheet support columns 146 to generally support sheets 115 and 116 in substantially planar relationship. It should be understood that in most cases proper placement of the electromagnetic devices contemplated herein will provide sufficient support for sheets to be joined without a need for auxiliary support columns 146. However, it may be preferred to provide support columns 146 or similar support structure for heavier and/or larger sheets, or to protect the magnetic devices from unnecessary wear and tear.

It also contemplated that in order to precisely and automatically control the sequential activation of the various coils of the electromagnets shown and described herein, a programmable controller 139 might preferably be utilized. It is contemplated that controller 139 could monitor and/or control the automatic alignment and hold-down capabilities of the alignment device of the present invention, as well as controlling successive feeding and preliminary alignment of sheets 115 and 116, activation of the magnetic coils for alignment procedures as described above, activation and control of welding device 165 to join aligned sheets 115 and 116 along seam S, as well as removal of joined sheets following welding.

Figure 3:
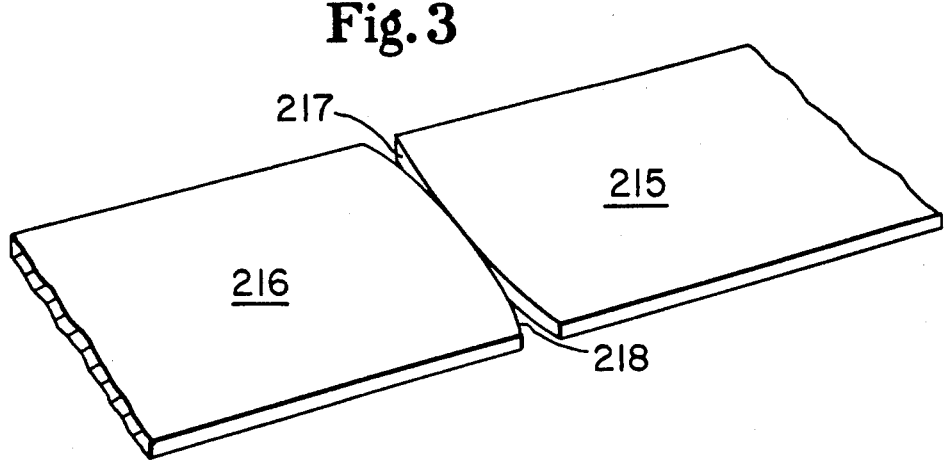
FIG. 3 is a partial perspective view illustrating the proximal edges of a pair of sheets whose confronting edges have been cut by conventional shearing techniques.

As set forth above, in order to ensure high quality welding seams, especially in high speed processes, it is important to ensure proper alignment between proximal edges of sheets to be joined. It should also be understood, however, that even with the best alignment procedures, if the proximal edges of the sheets themselves are not substantially straight, there can be relatively large variations in the gap along aligned proximal edges. FIG. 3 illustrates proximal edges 217 and 218 of adjacent sheets 215 and 216, respectively, which have been cut by conventional shear cutting techniques well known in the industry. As can be appreciated, conventional shearing techniques tend to result in a slight bowing or curvature along the cut, and such irregularity can result in undesirable variation in the gap between abutted proximal edges. In such situation, an underfill in either the top or the bottom of the weld can result from a variation in fit-up or gap size, even where optimum alignment is achieved such as through the automatic system set forth in the present invention.

Figure 4:
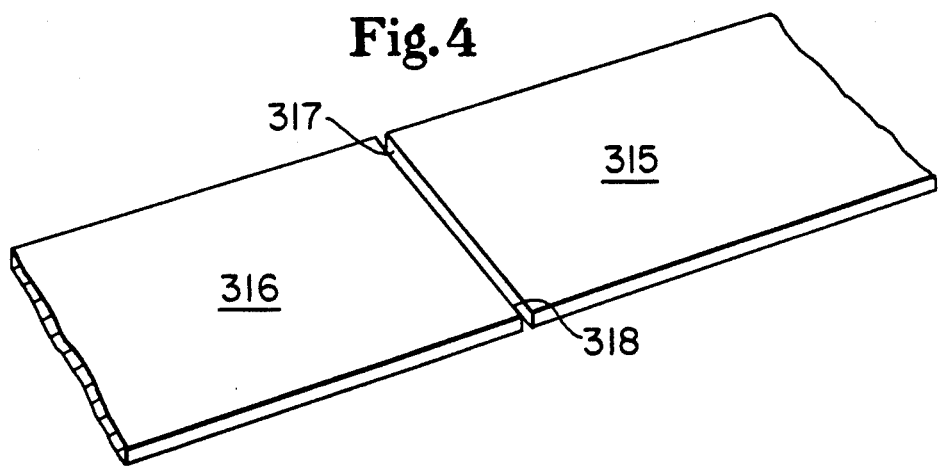
FIG. 4 is a partial perspective view similar to FIG. 3, showing the confronting proximal edges of approximately butted sheets which have been cut by laser welding techniques.

FIG. 4 illustrates proximal edges 317 and 318 of adjacent sheets 315 and 316, respectively, which have been prepared by laser cutting. It has been found that proximal edges which have been laser cut result in better fit-up, smaller gaps, and a more uniform and reliable weld profile. The increased uniformity provided by laser cutting correspondingly facilitates the achievement of consistently satisfactory welds in high speed processes.

It is contemplated that the present invention can be uniquely utilized to automatically align sheets (e.g. 215 and 216) for both laser cutting and laser welding. In particular, sheets which have been cut by conventional shearing techniques or the like (such as shown in FIG. 3) can be approximately abutted as shown and described with respect to FIGS. 1 and 2 above. With reference to FIG. 2, coil 142 could then be activated by power source 135 through switch 137 to magnetically restrain sheet 216 from movement. Auxiliary magnet 185 could be simultaneously activated to augment this magnetic restraint of sheet 216. Coils 133 of electromagnets 130 could then be activated to effectively simultaneously create a north pole along the proximal edge of one of the sheets, and an effective south pole along the corresponding proximal edge of the other sheet. As a result, the magnetic attraction between the proximal edges would automatically align edges 217 and 218 in intimate contact along their length providing a seam line SL.

Coil 143 might be selectively energized with alternating current to reduce frictional forces of sheet 215 to facilitate its alignment into intimate contact with sheet 216. It should be noted that electromagnet 180 can also be energized with alternating current to provide additional effective vibrating forces to reduce frictional forces on sheet 215, if desired. Following intimate alignment of proximal edges 217 and 218, coils 143 and 181 can be energized to provide magnetic restraint of further movement of sheet 215 as described above. At this time, power to coil 133 can be discontinued if desired. A laser cutting device (e.g. 165) can then be activated to trim proximal edges 217 and 218 as necessary. Following this laser trimming operation, direct current to coils 143 and 181 can be discontinued at the same time coil 133 is again activated to automatically align the trimmed proximal edges 217 and 218 if desired. During this alignment, coils 143 and 181 can be energized with alternating current to facilitate movement of sheet 215. Thereafter, coils 143 and 181 can be energized with direct current to again provide magnetic hold-down forces to sheet 215, and current to coil 133 can be discontinued. At this time, welding along the intimately aligned edges 217 and 218 (i.e. seam line SL) can be undertaken with laser device 165 or the like. It is well known that laser cutting and laser welding can be accomplished by a single laser device by simply adjusting the assist gas and pressures as appropriate. As a result, it can be seen that the automatic alignment capabilities of the present invention can be utilized in a variety of applications to automate and increase efficiency and reliability of alignment procedures for high speed trimming and welding procedures.

Figure 5:
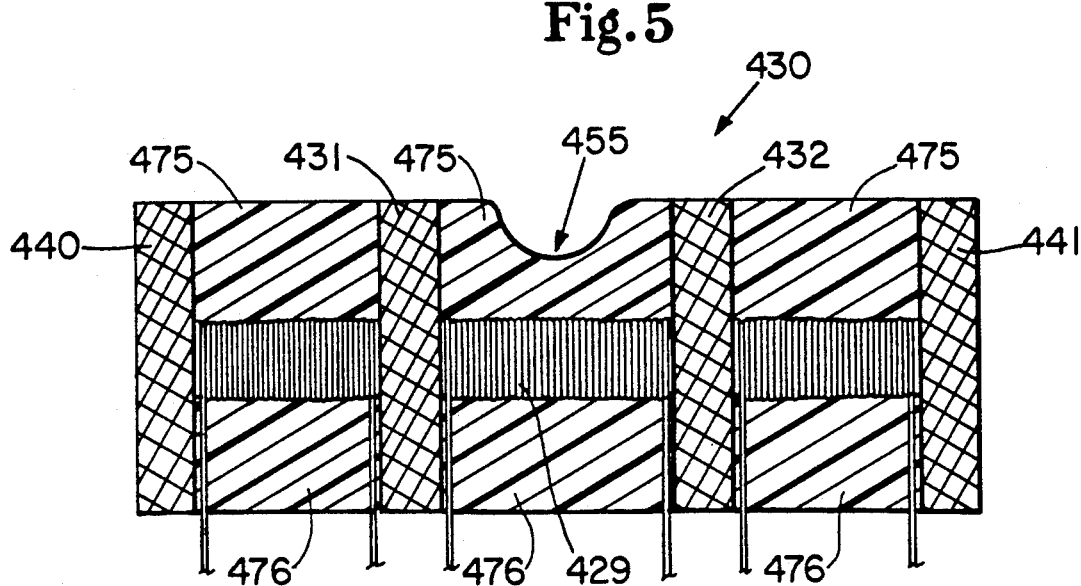
FIG. 5 is a cross-sectional view of a four-pole, three-coil electromagnet of the present invention having a weld splatter groove or trough for particular welding applications.

FIG. 5 illustrates a cross-sectional view of a four-pole magnetic arrangement made in accordance with the present invention for applications with laser welders and the like. It is contemplated that a high magnetic permeability core 429 can be formed with first and second poles 431 and 432, and having a curved weld splatter groove or trough 455 formed between poles 431 and 432. Weld splatter trough 455 is designed to be aligned below seam line SL of two or more sheets to be joined, and provides a relieved portion for absorbing light from the laser beam, as well as for collecting weld splatter and molten material from the sheets to be joined. This laser weld trough or dump can be utilized to protect other parts of the electromagnetic hold-down devices as described, and can facilitate periodic clean-up as necessary, such as by the application of an air pressure jet or a vacuum to trough 455 to collect debris. Non-magnetic insulator material (e.g. 475 and 476), which can be formed of plastic, epoxy or similar material known in the industry, separates adjacent poles 440, 431, 432 and 441, respectively. As shown, trough 455 can be conveniently formed in the insulator material. The structure of electromagnet 430 is illustrated only as a preferred means of providing the four-pole structure discussed above in a substantially compact and functional form. Electromagnetic devices as shown and described herein can be obtained from a variety of sources known in the industry such as AEC Magnetics of Cincinnati, OH.

Having shown and described the preferred embodiments of the present invention, further adaptions of the aligning device and method for aligning the proximal edges of sheets to be joined can be accomplished by appropriate modifications by one of ordinary skill in the art without departing from the scope of the present invention. Several potential modifications have been mentioned, and others will be apparent to those skilled in the art. For example, in some high speed welding operations, it is contemplated that hold-down devices may be unnecessary if the effective opposite poles established between the confronting proximal edges of the sheets are maintained throughout alignment and welding procedures. It should also be understood that the sheets to be joined may be dissimilar in composition, thickness, size, and overall conformation (e.g. differing surface textures, finishes or degrees of overall flatness), so long as they have proximal edges which can be butted as described herein. Similarly, it is contemplated that sheets to be connected which are not appreciably magnetic in composition can be effectively made appreciably magnetic as required herein by at least temporarily attaching one or more lengths of magnetic material to (either on the top or bottom surface of) any such sheets, whereby the magnetic flux created by application of the subject invention will automatically align the sheets in accordance with the description set forth above. Following alignment and joining procedures, the magnetic material may be removed from the sheets for reuse, as described. Accordingly, the scope of the present invention should be considered in terms of the following claims and is understood not to be limited to the details of structure and operation shown and described in the specification and drawings.

We claim:

1. A device for automatically aligning proximal edges of at least two appreciably magnetic individual sheets to be connected along said proximal edges, said device comprising:
   means for supporting said individual sheets in a substantially side-by-side relationship relative one another with their proximal edges oriented in approximately abutting relationship and generally aligned along a predetermined contiguous abutting seam line, at least one of said sheets being movably supported relative the other sheet; and
   means for simultaneously creating an effective magnetic pole along the proximal edge of one of said sheets and an effective magnetic pole of opposite polarity along the confronting proximal edge of the other of said sheets so as to cause a magnetic attraction between said proximal edges for moving at least said movably supported sheet toward the other sheet to automatically align said proximal edges in intimate contact along their length.

2. The alignment device of claim 1, wherein said means for simultaneously creating effective magnetic poles along the opposing proximal edges of said sheets comprises a magnetic device aligned adjacent each of said proximal edges.

3. The alignment device of claim 2, wherein said magnetic device further comprises an electromagnet having two spaced poles arranged to straddle said seam line, wherein one pole of the electromagnet is thereby situated in use so as to be adjacent the proximal edge of one of said sheets, and the second pole is adjacent the confronting proximal edge of the other of said sheets.

4. The alignment device of claim 1, further comprising a plurality of stops for generally aligning two or more individual sheets to be connected on said device such that their proximal edges are in approximately abutting registration and generally aligned along said seam line.

5. The alignment device of claim 1, further comprising additional fixturing means for restraining at least one of said individual sheets against movement during the automatic aligning procedures.

6. The alignment device of claim 5, wherein said fixturing means comprises a magnetic hold-down component for selectively restraining a first sheet against movement relative that component.

7. The alignment device of claim 5, further comprising a second additional fixturing means for selectively restraining a second sheet against movement following automatic aligning procedures.

8. The alignment device of claim 1, wherein said means for simultaneously creating effective magnetic poles along said proximal edges comprises a two pole, single coil electromagnet, wherein said two poles are spaced from one another and the respective confronting proximal edges of two or more sheet of magnetic material are each supported above and adjacent to one of such poles when in approximately abutting relationship.

9. The alignment device of claim 8, wherein said means for simultaneously creating effective magnetic poles comprises a plurality of said two pole, single coil electromagnets aligned in series along said seam line.

10. The alignment device of claim 1, wherein said means for simultaneously creating effective magnetic poles is selectively actuatable to provide automatic alignment of said sheets as desired.

11. A device for automatically aligning proximal edges of two or more substantially magnetic individual sheets of material to be connected along said proximal edges, said device comprising:
   means for supporting said individual sheets in substantially side-by-side relationship such that their proximal edges are oriented in approximately abutting relationship and such that said proximal edges are generally aligned along a predetermined contiguous seam line, at least one of said supported individual sheets being unrestrained from movement toward said seam line;
   magnetic means for creating an effective north pole along the proximal edge of one of the sheets to be connected and an effective south pole along the confronting proximal edge of an oppositely adjacent sheet such that a magnetic attraction is created between approximately abutting sheets and the proximal edge of at least said unrestrained sheet is magnetically pulled toward said seam line whereby the confronting proximal edges of the individual sheets are brought into intimate abutting contact along their length.

12. The alignment device of claim 11, wherein said magnet means comprises an electromagnet having a pair of spaced poles, said poles situated such that one pole is oriented on either side of said seam line.

13. The alignment device of claim 11, further comprising a plurality of stops to generally align said sheets on said support means such that their proximal edges are in approximately abutting relationship and are generally aligned along said seam line.

14. The alignment device of claim 11, further comprising additional hold-down fixture structure to restrain one or more of said sheets against movement during automatic alignment procedures.

15. The alignment device of claim 11, wherein said means for reducing friction further comprises means for applying an effective vibratory force to said movable sheet.

16. The alignment device of claim 15, wherein said vibratory force is applied to said movable sheet through application of alternating current to an electromagnet located adjacent said movable sheet.

17. The alignment device of claim 24, comprising a four-pole, three-coil electromagnet having its two central poles located on either side of said seam line, each of said coils being selectively excitable as desired, said central coil and the central two poles providing said means for creating said effective magnetic poles along the confronting proximal edges of said sheets, one of the outer coils and its associated spaced poles providing said additional hold-down fixture structure for selectively restraining one or more of the sheets during automatic aligning procedures, and said other outer coil and its associated spaced poles providing said means for selectively restraining said movable sheet.

18. A method for automatically aligning adjacent proximal edges of two or more individual sheets of magnetic material in intimate abutting contact, said method comprising the following steps:
    placing two or more individual sheets on a support structure with their proximal edges to be butted together in approximately abutting relationship and generally aligned along a predetermined contiguous seam line;
    creating an effective north pole along the proximal edge of one of said sheets and an effective south pole along the confronting proximal edge of the other of said sheets so as to cause a magnetic attraction between said proximal edges to be aligned; and
    permitting at least one of said proximal edges and any sheet associated with that one proximal edge to move toward the other of said proximal edges as a result of said magnetic attraction until said proximal edges are in intimate abutting contact along their length.

19. The method of claim 18, further comprising the step of once said proximal edges are in intimate contact along their length, restraining both proximal edges against further movement relative said seam line.

20. The method of claim 19, further comprising the step of terminating, only after both proximal edges are restrained against further movement, said effective north and south poles created in the respective proximal ends.

21. The method of claim 18, further comprising the step of restraining said other of the proximal edges and any sheet associated with that proximal edge against movement relative the seam line prior to creating the effective north and south poles.

22. A device for automatically aligning proximal edges of two or more substantially magnetic sheets of material to be connected along said proximal edges, said device comprising:
    means for supporting said sheets in substantially side-by-side relationship such that their proximal edges are oriented in approximately abutting relationship and such that said proximal edges are generally aligned along a predetermined contiguous seam line, at least one of said supported sheets being movable toward said seam line;
    magnetic means for creating an effective north pole along the proximal edge of one of the sheets to be connected and an effective south pole along the confronting proximal edge of an oppositely adjacent sheet such that a magnetic attraction is created between approximately abutting sheets and the proximal edges thereof are magnetically pulled into intimate abutting contact along their length; and
    an additional hold-down fixture to restrain one or more of said sheets against movement during automatic alignment procedures, said additional hold-down fixture comprising an electromagnet which can be selectively actuated.

23. A device for automatically aligning proximal edges of two or more substantially magnetic sheets of material to be connected along said proximal edges, said device comprising:
    means for supporting said sheets in substantially side-by-side relationship such that their proximal edges are oriented in approximately abutting relationship and such that said proximal edges are generally aligned along a predetermined contiguous seam line, at least one of said supported sheets being movable toward said seam line;
    magnetic means for creating an effective north pole along the proximal edge of one of the sheets to be connected and an effective south pole along the confronting proximal edge of an oppositely adjacent sheet such that a magnetic attraction is created between approximately abutting sheets and the proximal edges thereof are magnetically pulled into intimate abutting contact along their length; and
    means for reducing frictional forces opposing movement of said moveable sheet toward said seam line during automatic alignment procedures.

24. A device for automatically aligning proximal edges of two or more substantially magnetic sheets of material to be connected along said proximal edges, said device comprising:
    means for supporting said sheets in substantially side-by-side relationship such that their proximal edges are oriented in approximately abutting relationship and such that said proximal edges are generally aligned along a predetermined contiguous seam line, at least one of said supported sheets being movable toward said seam line;
    magnetic means for creating an effective north pole along the proximal edge of one of the sheets to be connected and an effective south pole along the confronting proximal edge of an oppositely adjacent sheet such that a magnetic attraction is created between approximately abutting sheets and the proximal edges thereof are magnetically pulled into intimate abutting contact along their length;

a hold-down fixture for restraining one or more of said sheets against movement during automatic alignment procedures; and means for selectively restraining said movable sheet against further movement relative said seam line.

* * * * *

UNITED STATES PATENT AND TRADEMARK OFFICE
CERTIFICATE OF CORRECTION

PATENT NO. : 5,023,427

DATED : June 11, 1991

INVENTOR(S) : Gary L. Neiheisel and David C. McGraw

It is certified that error appears in the above-identified patent and that said Letters Patent is hereby corrected as shown below:

Claim 15, column 13, line 22, "Claim 11" should read --Claim 23--.

Signed and Sealed this

Third Day of November, 1992

Attest:

DOUGLAS B. COMER

Attesting Officer

Acting Commissioner of Patents and Trademarks